(12) United States Patent
Nozaki

(10) Patent No.: US 12,096,106 B2
(45) Date of Patent: Sep. 17, 2024

(54) IMAGE PICKUP APPARATUS SUPPRESSING TEMPERATURE CHANGE MISALIGNMENT

(71) Applicant: CANON KABUSHIKI KAISHA, Tokyo (JP)

(72) Inventor: Kosuke Nozaki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 92 days.

(21) Appl. No.: 18/064,425

(22) Filed: Dec. 12, 2022

(65) Prior Publication Data

US 2023/0300438 A1 Sep. 21, 2023

(30) Foreign Application Priority Data

Dec. 17, 2021 (JP) ................. 2021-205130

(51) Int. Cl.
*H04N 5/335* (2011.01)
*H04N 23/54* (2023.01)
*H04N 23/55* (2023.01)

(52) U.S. Cl.
CPC ............. *H04N 23/55* (2023.01); *H04N 23/54* (2023.01)

(58) Field of Classification Search
CPC .............................. H04N 23/55; H04N 23/52
See application file for complete search history.

(56) References Cited

U.S. PATENT DOCUMENTS

| | | | | |
|---|---|---|---|---|
| 9,176,298 B1 * | 11/2015 | Gustafson | ............. | H04N 23/55 |
| 9,658,423 B2 * | 5/2017 | Gustafson | ............. | G02B 7/008 |
| 10,054,757 B2 * | 8/2018 | Knutsson | ............. | B60R 11/04 |
| 11,867,967 B2 | 1/2024 | Kim | | |
| 11,966,040 B2 * | 4/2024 | Ofir | ............. | A61B 1/0011 |
| 2009/0237537 A1 | 9/2009 | Maruyama | | |

(Continued)

FOREIGN PATENT DOCUMENTS

| | | |
|---|---|---|
| CN | 105578736 A | 5/2016 |
| JP | 6054720 B2 | 12/2016 |

(Continued)

OTHER PUBLICATIONS

The above foreign references Nos. 1-2, 4-5 and 6 are cited in the related U.S. Appl. No. 18/064,403, filed Dec. 12, 2022 "Lens Apparatus and Image Pickup Apparatus".

(Continued)

*Primary Examiner* — Gary C Vieaux
(74) *Attorney, Agent, or Firm* — Cowan, Liebowitz & Latman, P.C.

(57) ABSTRACT

An image pickup apparatus includes a housing, an image sensor held by the housing, a lens frame that holds a plurality of lenses, and a connecting portion that connects the housing and the lens frame, and having an annular shape. The connecting portion includes a first portion provided to an inner surface of the connecting portion, and a second portion provided to an outer surface of the connecting portion. The first portion of the connecting portion engaged with an outer surface of the lens frame. The second portion of the connecting portion engaged with a first inner surface of the housing. The lens frame includes a first sliding portion engaged with the first inner surface of the housing and slidable in an optical axis direction of the plurality of lenses.

8 Claims, 2 Drawing Sheets

(56) References Cited

U.S. PATENT DOCUMENTS

| | | | |
|---|---|---|---|
| 2013/0093948 A1 | 4/2013 | Takeshita | |
| 2014/0307162 A1 | 10/2014 | Li | |
| 2016/0295081 A1* | 10/2016 | Graff | G02B 7/028 |
| 2017/0042058 A1 | 2/2017 | Pope | |
| 2017/0129418 A1 | 5/2017 | Koshiba | |
| 2017/0276895 A1 | 9/2017 | Sakuma et al. | |
| 2018/0107099 A1 | 4/2018 | Yasuda | |
| 2018/0234594 A1 | 8/2018 | Lim | |
| 2018/0241917 A1 | 8/2018 | Zhang | |
| 2019/0349507 A1 | 11/2019 | Lee | |
| 2019/0373142 A1 | 12/2019 | Fujiwara | |
| 2020/0033549 A1 | 1/2020 | Liu | |
| 2020/0049932 A1 | 2/2020 | Wei | |
| 2021/0302805 A1 | 9/2021 | Yoshida | |
| 2021/0397072 A1 | 12/2021 | Ding | |
| 2022/0059266 A1 | 2/2022 | Saito | |
| 2022/0196963 A1 | 6/2022 | Suginome | |
| 2023/0098815 A1 | 3/2023 | Cho | |
| 2023/0152576 A1* | 5/2023 | Nozaki | H04N 23/52 |
| | | | 348/374 |
| 2023/0194827 A1* | 6/2023 | Ono | G02B 7/023 |
| | | | 359/819 |
| 2023/0199288 A1* | 6/2023 | Saito | H04N 23/54 |
| | | | 348/374 |
| 2023/0199289 A1* | 6/2023 | Suzuki | H04N 25/79 |
| | | | 348/374 |
| 2023/0244128 A1* | 8/2023 | Van Den Brink | G03B 17/02 |
| | | | 359/820 |
| 2023/0367184 A1 | 11/2023 | Inaba | |
| 2023/0418020 A1 | 12/2023 | Hwang | |

FOREIGN PATENT DOCUMENTS

| | | |
|---|---|---|
| JP | 2017-098891 A | 6/2017 |
| JP | 2018-141861 A | 9/2018 |
| JP | 6391122 B2 | 9/2018 |
| JP | 2020-014003 A | 1/2020 |
| JP | 2020-027278 A | 2/2020 |
| JP | 6912530 B2 | 8/2021 |

OTHER PUBLICATIONS

The above foreign references Nos. 2-3 and 5-7 are cited in the related U.S. Appl. No. 18/064,408, filed Dec. 12, 2022 "Image Pickup Apparatus".

The above foreign references Nos. 1, 3-4 and 6-7 are cited in the related U.S. Appl. No. 18/064,420, filed Dec. 12, 2022 "Image Pickup Apparatus".

The above U.S. Patent Documents were cited in a U.S. Office Action issued on Jun. 6, 2024, a copy of which is not enclosed, that issued in U.S. Appl. No. 18/064,408.

The above patent documents were cited in the Jun. 24, 2024 U.S. Office Action, a copy of which is enclosed that issued in U.S. Appl. No. 18/064,420.

* cited by examiner

IMAGE PICKUP APPARATUS SUPPRESSING TEMPERATURE CHANGE MISALIGNMENT

BACKGROUND

Technical Field

One of the aspects of the disclosure relates to an image pickup apparatus.

Description of the Related Art

Image pickup apparatuses for outdoor environments such as in-vehicle cameras and surveillance cameras are demanded to be stably usable from low temperature to high temperature. As the temperature changes, a component in a lens unit expands and contracts, and a distance (back focus) from a rearmost portion of the lens unit to the focal plane changes, and thus the resolution of the image pickup apparatus may deteriorate.

Japanese Patent No. ("JP") 6391122 discloses a lens assembly that cancels out a back focus shift of the lens unit by expanding and contracting an inner expanding/contracting portion and an outer expanding/contracting portion. JP 6912530 discloses a camera that cancels out a back focus shift of an optical system by expanding and contracting a ring-shaped change member based on temperature change.

The lens assembly disclosed in JP 6391122 is likely to generate misalignment (optical axis shift) between the optical axis of the lens unit and the imaging center of the image sensor due to dimensional variations of each of the plurality of components (working variation). The camera disclosed in JP 6912530 needs to fix the change member with an adhesive in holding the change member so as not to hinder its expansion and contraction. In this case, under a temperature environment with a large temperature difference, the adhesion strength of the adhesive deteriorates and each member may peel off or come off.

SUMMARY

One of the aspects of the disclosure provides an image pickup apparatus that can suppress misalignment (or positional shift) with a stable configuration even in a case where temperature changes.

An image pickup apparatus according to one aspect of the disclosure includes a housing, an image sensor held by the housing, a lens frame that holds a plurality of lenses, and a connecting portion that connects the housing and the lens frame, and having an annular shape. The connecting portion includes a first portion provided to an inner surface of the connecting portion, and a second portion provided to an outer surface of the connecting portion. The first portion of the connecting portion engaged with an outer surface of the lens frame. The second portion of the connecting portion engaged with a first inner surface of the housing. The lens frame includes a first sliding portion engaged with the first inner surface of the housing and slidable in an optical axis direction of the plurality of lenses.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure.

Figure 1:
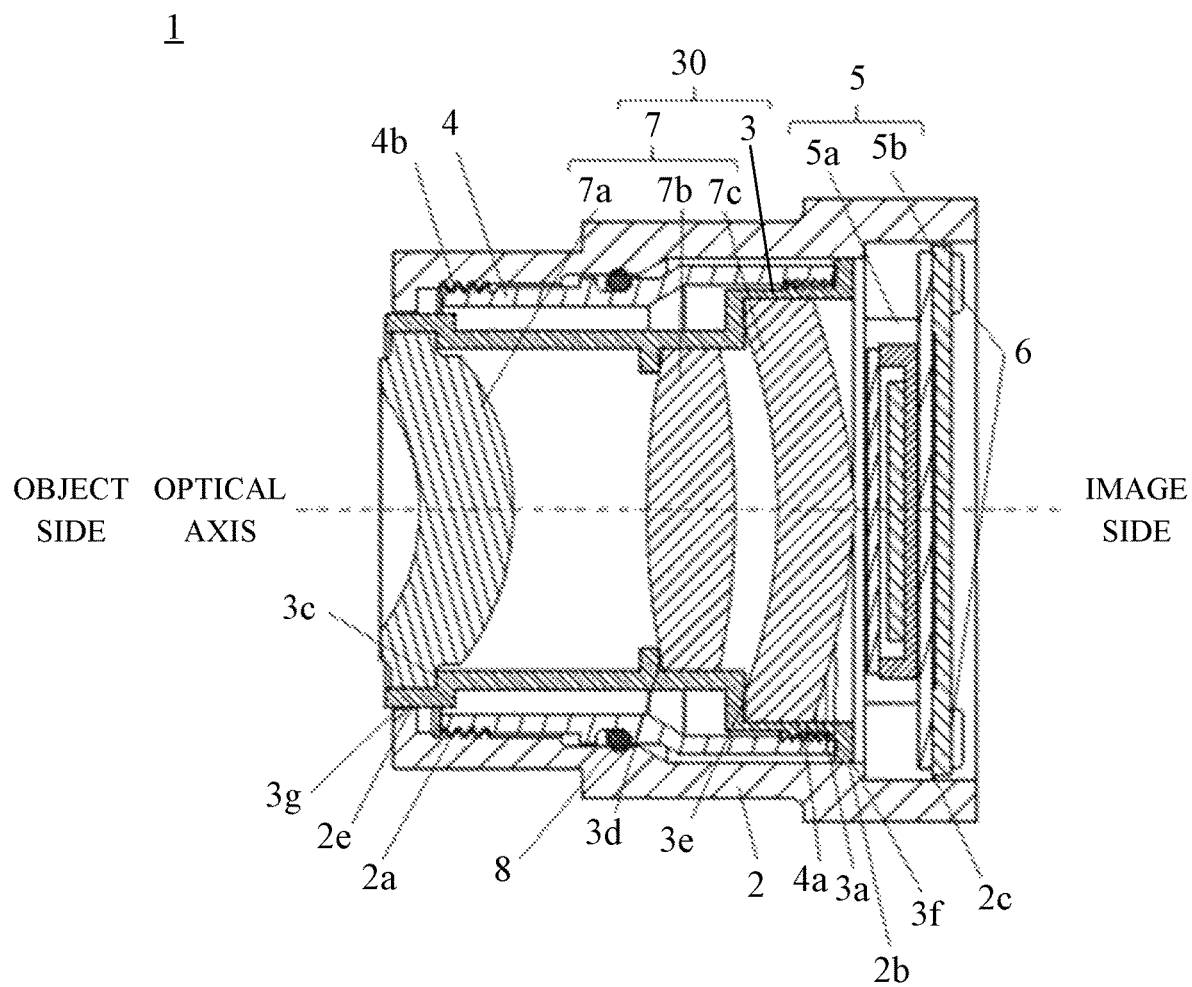
FIG. 1 is a sectional view of an image pickup apparatus according to this embodiment.
Figure 2A:
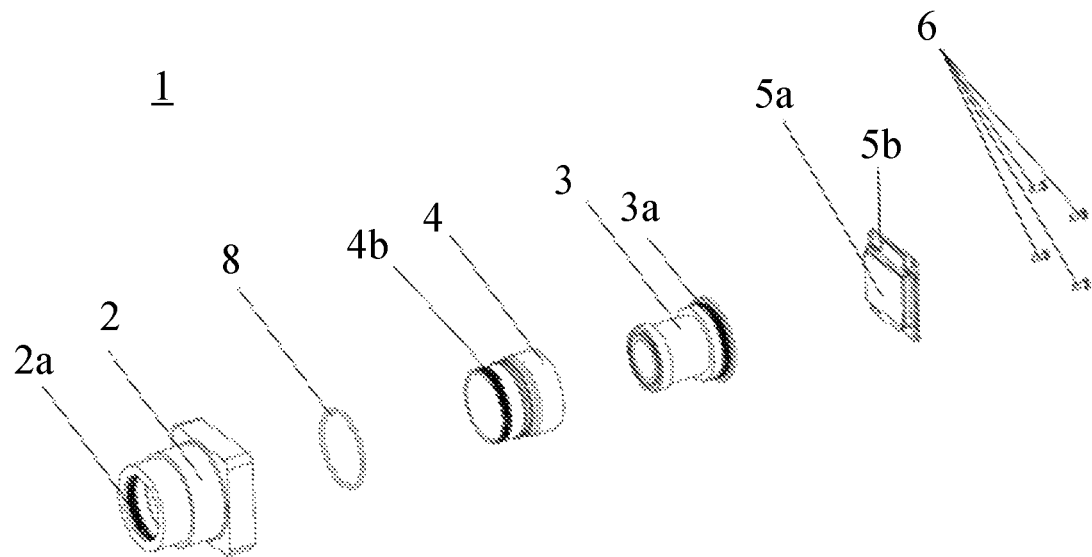
FIGS. 2A and 2B are exploded perspective views of the image pickup apparatus according to this embodiment.
Figure 2B:
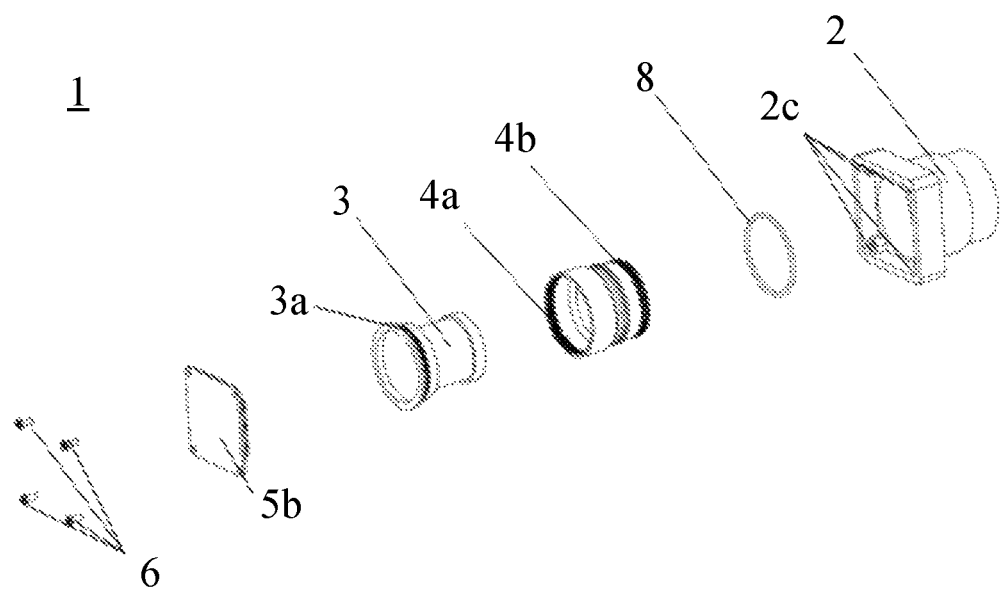

Referring now to FIGS. 1, 2A, and 2B, a description will be given of an image pickup apparatus 1 according to this embodiment. FIG. 1 is a sectional view of the image pickup apparatus 1. FIG. 2A is an exploded perspective view of the image pickup apparatus 1 viewed from an object side. FIG. 2B is an exploded perspective view of the image pickup apparatus 1 viewed from an image side.

A housing 2 has an opening, and includes an inner diameter threaded portion 2a, an inner diameter engagement portion (first inner diameter portion) 2b, an inner diameter engagement portion (second inner diameter portion) 2e, and a sensor unit holding portion 2c. A sensor unit 5 includes an image sensor 5a, such as a CMOS sensor, and a sensor plate 5b. The image sensor 5a is held on the sensor plate 5b with a UV adhesive or the like. The sensor unit 5 is attached to the sensor unit holding portion 2c of the housing 2 and fixed to it with screws 6.

A lens unit 30 includes a lens frame 3 and lenses (imaging optical system) 7 and is disposed inside the housing 2. In this embodiment, the lenses 7 include, but are not limited to, three lenses, that is, a first lens 7a, a second lens 7b, and a third lens 7c. The lens frame 3 includes an outer diameter threaded portion 3a, a first lens holding portion 3c, a second lens holding portion 3d, a third lens holding portion 3e, a first sliding portion 3f, and a second sliding portion 3g. The lenses 7 are held inside the lens frame 3. The first lens 7a contacts and is held by the first lens holding portion 3c. The second lens 7b contacts and is held by the second lens holding portion 3d. The third lens 7c contacts and is held by the third lens holding portion 3e.

A connecting portion 4 connects the housing 2 and the lens frame 3. The connecting portion 4 has an annular shape, and includes an inner diameter threaded portion (first portion) 4a provided on the inner diameter of the annulus, and an outer diameter threaded portion (second portion) 4b provided on the outer diameter of the annulus. The connecting portion 4 is disposed outside the lens unit 30 and inside the housing 2. The connecting portion 4 is held by the housing 2 because the inner diameter threaded portion 2a of the housing 2 and the outer diameter threaded portion 4b of the connecting portion 4 are screwed together. At this time, the connecting portion 4 and the housing 2 does not contact each other except for the screwed position. The lens unit 30 is held by the connecting portion 4 because the inner diameter threaded portion 4a of the connecting portion 4 and the outer diameter threaded portion 3a of the lens frame 3 are screwed together.

The first sliding portion 3f of the lens unit 30 is slidably engaged with (fitted into) an engagement portion 2b provided on the inner diameter of the housing 2. That is, the first sliding portion 3f is engaged with the inner diameter engagement portion 2b of the housing 2 and is slidable in the optical axis direction of the lenses 7. The second sliding portion 3g of the lens unit 30 is slidably engaged with (fitted into) an inner diameter engagement portion 2e provided on the inner diameter of the housing 2. That is, the second sliding portion 3g is engaged with the inner diameter engagement portion 2e of the housing 2 and is slidable in the optical axis direction.

A position of each engagement in the optical axis direction may be substantially the same as that of the first lens 7a or the third lens 7c in the optical axis direction. That is, the first sliding portion 3f may be disposed closest to the lens 7c disposed closest to the image sensor 5a (the image plane) among the plurality of lenses 7, and the second sliding portion 3g may be disposed closest to the lens 7a disposed furthest to the image sensor 5a (closest to the object) among the plurality of lenses 7. The position of the first sliding portion 3f in the optical axis direction may be the same as that of the lens 7c in the optical axis direction, and the position of the second sliding portion 3g in the optical axis direction may be the same as that of the lens 7a in the optical axis direction. Thereby, a tilt amount of tilt of the entire lens unit 30 can be suppressed.

In this embodiment, the first sliding portion 3f, the inner diameter engagement portion 2b of the housing 2, the second sliding portion 3g, and the inner diameter engagement portion 2e of the housing 2 may satisfy the following inequality (1):

$$|L2 \times \alpha 2 - L1 \times \alpha 1| * \Delta t < L1 - L2 \quad (1)$$

where L1 is an inner diameter of the housing 2, L2 is an outer diameter of the lens unit 30, $\alpha 1$ is a thermal expansion coefficient of the housing 2, $\alpha 2$ is a thermal expansion coefficient of the lens frame 3, and $\Delta t$ is temperature change. For example, the inner diameter L1 is a diameter (minimum diameter) of the inner diameter engagement portion 2b of the housing 2, and the outer diameter L2 is a diameter (maximum diameter) of the first sliding portion 3f of the lens frame 3. Alternatively, the inner diameter L1 is a diameter (minimum diameter) of the inner diameter engagement portion 2e of the housing 2, and the outer diameter L2 is a diameter (maximum diameter) of the second sliding portion 3g of the lens frame 3.

The connecting portion 4 has a groove portion 4c. An elastic body (or member) 8 is housed in the groove portion 4c, and the elastic body 8 is sandwiched between the groove portion 4c and the inner diameter of the housing 2. That is, in this embodiment, the elastic body 8 is disposed (held) between the outer diameter of the connecting portion 4 and the inner diameter of the housing 2. Thereby, the holding force between the housing 2 and the connecting portion 4 is assisted.

A description will be given of focusing due to temperature change in the image pickup apparatus 1. The screwed position between the inner diameter threaded portion 4a of the connecting portion 4 of the image pickup apparatus 1 and the outer diameter threaded portion 3a of the lens frame 3 is disposed on the image side of the screwed position between inner diameter threaded portion 2a of the housing 2 and the outer diameter threaded portion 4b of the connecting portion 4 and the first lens holding portion 3c of the lens frame 3. The thermal expansion coefficient of the connecting portion 4 is larger than that of each of the housing 2 and the lens frame 3.

A description will now be given of a case where the ambient temperature rises as an example. In a case where the temperature of the lenses 7 rises as the ambient temperature rises, characteristic changes such as changes in the refractive indexes of the lenses 7 and thermal deformations of the lenses 7 occur and thus the imaging position of the lenses 7 changes in an object-side direction away from the image sensor 5a. In a case where the temperature further rises, the housing 2 thermally expands in a direction extending toward the object side from the sensor unit holding portion 2C as a reference, and similarly the lens frame 3 thermally expands in a direction extending toward the object side from the screwed position between the connecting portion 4 and the lens frame 3 as a reference. Therefore, the imaging position of the lenses 7 changes in the object-side direction away from the image sensor 5a. On the other hand, in a case where the temperature rises, the connecting portion 4 thermally expands in a direction extending toward the image side from the screwed position between the connecting portion 4 and the housing 2 as a reference.

The operation of the connecting portion 4 can compensate for the displacement of the imaging position that tends to move away from the image sensor 5a in the object-side direction due to the characteristic changes of the lenses 7 and the thermal expansions of the housing 2 and the lens frame 3. Thereby, even if the temperature rises, the imaging position and the position of the image sensor 5a can coincide with each other within a range of the depth of focus, and blur-free good image quality can be maintained.

A description will now be given of the behavior of the engagement portion between the lens frame 3 and the housing 2. For example, assume a case where the housing 2 and the lens frame 3 are set by the materials and dimensions illustrated in Table 1 below. At this time, a gap between the engagement portion between the lens frame 3 and the housing 2 at room temperature is 21.5−21.493=0.007 mm, that is, there is a minimum gap of 7 μm. For example, in a case where the temperature change $\Delta t$ is +80° C., an expansion amount caused by the temperature change is $|21.5 \times 210 \times 10^{-7} - 21.493 \times 250 \times 10^{-7}| \times 80 = 0.0068$ mm, that is, 6.8 μm. Since the set gap is larger than the expansion amount, the gap remains regardless of the expansion. Hence, the sliding in the engagement state can be secured without inhibiting extension due to the expansion of the connecting portion 4. Thereby, the housing 2 is the only component interposed between the lens unit 30 and the sensor unit 5, and this structure reduces the factors of dimensional variations of the components and misalignment between the optical axis of the lens unit 30 and the imaging center of the sensor unit 5, that is, the optical axis shift.

TABLE 1

| COM-PONENT | MATERIAL | THERMAL EXPANSION COEFFICIENT $\alpha [/° C.]$ | ENGAGEMENT PORTION [mm] |
|---|---|---|---|
| HOUSING 2 | ALUMINUM | $\alpha 1$: $210 \times 10^{-7}$ | L1: MINIMUM DIAMETER φ21.5 |
| LENS FRAME 3 | POLYCARBONATE (GLASS FIBER INCLUDED) | $\alpha 2$: $250 \times 10^{-7}$ | L2: MAXIMUM DIAMETER φ21.493 |

Due to the above structure, the inner diameter threaded portion 4a of the connecting portion 4 and the outer diameter threaded portion 3a of the lens unit 30 are screwed together, the outer diameter threaded portion 4b of the connecting portion 4 and the inner diameter threaded portion 2a of the housing 2 are screwed together, and the lens unit 30 is screwed with the housing 2 through the connecting portion 4. The connecting portion 4 has the groove portion 4c that houses the elastic body 8, and the elastic body 8 is sandwiched between the groove portion 4c and the inner diameter of the housing 2. Thereby, the holding force is assisted by the connecting portion 4 and the housing 2, and stable holding can be maintained even with temperature changes such as in a high or low-temperature environment.

Despite the expansion and contraction caused by environmental temperature changes of the connecting portion 4 and the characteristic changes of the lenses 7 and the expansions and contractions of the housing 2 and the lens frame 3 caused by the temperature change, the displacement of the imaging position that tends to move away from the image sensor 5a can be compensated for. Thereby, even if the temperature changes, the imaging position and the position of the image sensor 5a coincide within the range of the depth of focus and thus blur-free good image quality can be maintained.

Due to the engagement portion between the lens unit 30 and the housing 2, the housing 2 becomes the only component interposed between the lens unit 30 and the sensor unit 5. Thus, the factors of dimensional variations of the components can be reduced, and the misalignment between the optical axis of the lens unit 30 and the imaging center of the sensor unit 5, that is, the optical axis shift can be reduced or prevented.

In this embodiment, the position of each of the first sliding portion 3f of the lens unit 30 and the corresponding inner diameter engagement portion 2b of the housing 2 in the optical axis direction is substantially the same as the position of the third lens 7c. The position of each of the second sliding portion 3g of the lens unit 30 and the corresponding inner diameter engagement portion 2e of the housing 2 in the optical axis direction is substantially the same as the position of the first lens 7a. Thereby, the tilt of the lens unit 30 relative to the sensor unit 5 can be suppressed, and the optical axis shift can be further reduced.

As described above, this embodiment can provide an image pickup apparatus that can suppress misalignment with a stable structure even if the temperature changes. The image pickup apparatus according to this embodiment is suitable for an on-vehicle camera, a surveillance camera, a network camera, or the like, but can also be applied to another image pickup apparatus.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-205130, filed on Dec. 17, 2021, which is hereby incorporated by reference herein in its entirety.

What is claimed is:

1. An image pickup apparatus comprising:
a housing;
an image sensor held by the housing;
a lens frame that holds a plurality of lenses; and
a connecting portion that connects the housing and the lens frame, and having an annular shape,
wherein the connecting portion includes a first portion provided to an inner surface of the connecting portion, and a second portion provided to an outer surface of the connecting portion,
wherein the first portion of the connecting portion engaged with an outer surface of the lens frame,
wherein the second portion of the connecting portion engaged with a first inner surface of the housing, and
wherein the lens frame includes a first sliding portion engaged with the first inner surface of the housing and slidable in an optical axis direction of the plurality of lenses.

2. The image pickup apparatus according to claim 1, wherein the first portion and the second portion include screws, respectively.

3. The image pickup apparatus according to claim 1, further comprising an elastic body disposed between the outer surface of the connecting portion and the inner surface of the housing.

4. The image pickup apparatus according to claim 1, wherein the housing includes a second inner surface, and
wherein the lens frame includes a second sliding portion engaged with the second inner surface of the housing and slidable in the optical axis direction.

5. The image pickup apparatus according to claim 4, wherein the first sliding portion is disposed closest to a lens disposed closest to the image sensor among the plurality of lenses, and
wherein the second sliding portion is disposed closest to a lens disposed farthest to the image sensor among the plurality of lenses.

6. The image pickup apparatus according to claim 5, wherein a position of the first sliding portion in the optical axis direction is the same as that of the lens disposed closest to the image sensor in the optical axis direction, and
wherein a position of the second sliding portion in the optical axis direction is the same as that of the lens disposed farthest to the image sensor in the optical axis direction.

7. The image pickup apparatus according to claim 1, wherein the following inequality is satisfied:

$$|L2 \times \alpha 2 - L1 \times \alpha 1| \times \Delta t < L1 - L2$$

where L1 is an inner diameter of the first inner surface of the housing, L2 is an outer diameter of the first sliding portion of the lens frame, $\alpha 1$ is a thermal expansion coefficient of the housing, $\alpha 2$ is a thermal expansion coefficient of the lens frame, and $\Delta t$ is a temperature change.

8. The image pickup apparatus according to claim 4, wherein the following inequality is satisfied:

$$|L2 \times \alpha 2 - L1 \times \alpha 1| \times \Delta t < L1 - L2$$

where L1 is an inner diameter of the second inner surface of the housing, L2 is an outer diameter of the second sliding portion of the lens frame, $\alpha 1$ is a thermal expansion coefficient of the housing, $\alpha 2$ is a thermal expansion coefficient of the lens frame, and $\Delta t$ is a temperature change.

* * * * *